US007818468B2

(12) United States Patent
Richard et al.

(10) Patent No.: US 7,818,468 B2
(45) Date of Patent: Oct. 19, 2010

(54) METHOD AND SYSTEM FOR PROCESSING CONTROL INFORMATION

(75) Inventors: Elizabeth Anne Richard, Plano, TX (US); Sumit Rupri Das, Richardson, TX (US); Paul Timothy Howard, Richardson, TX (US); Scott Adam Morrison, Richardson, TX (US); Pradipkuma A. Thaker, Hilliard, OH (US); Roy David Wojciechowski, Round Rock, TX (US)

(73) Assignee: Texas Instruments Incorporated, Dallas, TX (US)

( * ) Notice: Subject to any disclaimer, the term of this patent is extended or adjusted under 35 U.S.C. 154(b) by 99 days.

(21) Appl. No.: 12/164,070

(22) Filed: Jun. 29, 2008

(65) Prior Publication Data
US 2009/0327527 A1 Dec. 31, 2009

(51) Int. Cl.
*G06F 3/00* (2006.01)
(52) U.S. Cl. .................. 710/10; 710/306; 710/105
(58) Field of Classification Search ............. 710/1–4, 710/36–38, 104–106, 306, 311–317
See application file for complete search history.

(56) References Cited
U.S. PATENT DOCUMENTS

| | | | |
|---|---|---|---|
| 5,463,735 A * | 10/1995 | Pascucci et al. ............. | 709/222 |
| 6,760,793 B2 | 7/2004 | Kelley et al. | |
| 7,191,268 B2 * | 3/2007 | Adams et al. ............... | 710/105 |
| 2005/0105516 A1 | 5/2005 | Stewart et al. | |
| 2008/0059679 A1 * | 3/2008 | Zhang et al. ............... | 710/301 |
| 2008/0140892 A1 * | 6/2008 | Fong et al. .................. | 710/111 |
| 2009/0083471 A1 * | 3/2009 | Frey et al. ................... | 710/316 |
| 2009/0193164 A1 * | 7/2009 | Ajanovic et al. ........... | 710/107 |

OTHER PUBLICATIONS

Peripheral Component Interconnect Special Interest Group ("PCI-SIG®"), "PCI Express® Base Specification, Revision 2.0," Dec. 20, 2006, pp. 1-608, PCI-SIG, United States.
Peripheral Component Interconnect Special Interest Group ("PCI-SIG®"), "PCI Express™ Base Specification, Revision 1.1," Mar. 28, 2005, pp. 1-508, PCI-SIG, United States.
Peripheral Component Interconnect Special Interest Group ("PCI-SIG®"), "Errata for the PCI Express Base Specification, Revision 1.1," Feb. 8, 2007, pp. 1-41, PCI-SIG, United States.
Peripheral Component Interconnect Special Interest Group ("PCI-SIG®"), "PCI Local Bus Specification, Revision 3.0," Feb. 3, 2004, pp. 1-344, PCI-SIG, United States.

* cited by examiner

*Primary Examiner*—Raymond N Phan
(74) *Attorney, Agent, or Firm*—Dawn V. Stephens; Wade James Brady, III; Frederick J. Telecky, Jr.

(57) ABSTRACT

In one aspect, an integrated circuit device including a first-level module configurable to receive and transmit control information, said first level module including a first sub-level module, a second sub-level module operably coupleable to the first sub-level module, and a third sub-level module operably coupleable to the second module; and a second-level module operably coupleable to the first-level module is disclosed.

19 Claims, 9 Drawing Sheets

| 31 ... 28 | 27 ... 24 | 23 ... 20 | 19 ... 16 | 15 ... 12 | 11 ... 08 | 07 ... 04 | 03 ... 00 |
|---|---|---|---|---|---|---|---|
| INSTANCE NUMBER | INTERNAL CONFIGURATION BUS ADDRESS | | | | | | |

*FIG. 6*

| INSTANCE NUMBER | ADDRESS SPACE |
|---|---|
| 4'h0 | FIRST-LEVEL MODULE |
| 4'h1 | SECOND-TYPE SECOND-LEVEL MODULE 1 |
| 4'h2 | SECOND-TYPE SECOND-LEVEL MODULE 2 |
| 4'h3 | SECOND-TYPE SECOND-LEVEL MODULE 3 |
| 4'h4 | SECOND-TYPE SECOND-LEVEL MODULE 4 |
| 4'h5 | SECOND-TYPE SECOND-LEVEL MODULE 5 |
| 4'h6 | SECOND-TYPE SECOND-LEVEL MODULE 6 |
| 4'h7 | SECOND-TYPE SECOND-LEVEL MODULE 7 |
| 4'h8 | FIRST-TYPE SECOND-LEVEL MODULE 0 |
| 4'h9 | FIRST-TYPE SECOND-LEVEL MODULE 1 |
| 4'hA | FIRST-TYPE SECOND-LEVEL MODULE 2 |
| 4'hB | FIRST-TYPE SECOND-LEVEL MODULE 3 |
| 4'hC | FIRST-TYPE SECOND-LEVEL MODULE 4 |
| 4'hD | FIRST-TYPE SECOND-LEVEL MODULE 5 |
| 4'hE | FIRST-TYPE SECOND-LEVEL MODULE 6 |
| 4'hF | BROADCAST |

*FIG. 7*

| INTERNAL CONFIGURATION BUS ADDRESS RANGE | | TRANSACTIONS |
| --- | --- | --- |
| 28'h001_0000 | 28'hFFF_FFFF | FIRST-TYPE TRANSACTIONS |
| 28'h000_3000 | 28'h000_FFFF | SECOND-TYPE TRANSACTIONS |
| 28'h000_2100 | 28'h000_2FFF | RESERVED FOR FUTURE USE |
| 28'h000_2000 | 28'h000_20FF | THIRD-TYPE TRANSACTIONS |
| 28'h000_1200 | 28'h000_1FFF | RESERVED FOR FUTURE USE |
| 28'h000_1000 | 28'h000_11FF | FOURTH-TYPE TRANSACTIONS |
| 28'h000_0100 | 28'h000_0FFF | FIFTH-TYPE TRANSACTIONS |
| 28'h000_0000 | 28'h000_00FF | SIXTH-TYPE TRANSACTIONS |

METHOD AND SYSTEM FOR PROCESSING CONTROL INFORMATION

FIELD OF THE INVENTION

This invention relates generally to data handling in integrated circuit systems. More particularly, this invention relates to the handling of control information in integrated circuit systems.

BACKGROUND OF THE INVENTION

Integrated circuit systems perform a wide variety of computational and data handling functions. Integrated circuit systems may comprise or may be found in devices including but not limited to computers such as laptop and desktop computers, telephones, personal digital assistant ("PDA") devices, video and audio devices such as entertainment systems, servers, routers, and switches. Integrated circuit systems may include a large number of integrated circuit devices. These integrated circuit devices perform specific functions in the context of the integrated circuit systems of which they are components.

During the operation of such integrated circuit systems, the configurations of many of the integrated circuit devices may have to be determined and many of the integrated circuit devices may have to be configured or re-configured as the integrated circuit system functions. This is accomplished by sending control information to the devices and by gathering control information from the devices. Control information may include without being limited to, for example, information that directs a device to accept data information such as video information or audio information at a specified rate, information that specifies screen size, information that specifies refresh rate, and information that turns a device on or off or otherwise manages power consumption. Herein, "control information" includes status information and requests for status information. Data information may include, for example, information representing a video image to be processed and displayed by a graphics controller and a display screen. An integrated circuit device may be configured when it is booted, during operations after booting, or between operations after booting. In some architectures such as the PCI Express® ("PCIe®") architecture, control information is typically embedded in the same information streams as data information.

Where control information and data information are embedded in the same information streams, devices that handle those information streams such as switches are burdened with both control information and data information. If such devices are required to handle only control information, they may perform with greater efficiency.

SUMMARY OF THE INVENTION

In one aspect, an integrated circuit device includes but is not limited to a first-level module configurable to receive and transmit control information, said first level module including a first sub-level module, a second sub-level module operably coupleable to the first sub-level module, and a third sub-level module operably coupleable to the second module; and a second-level module operably coupleable to the first-level module.

In one aspect, a method for operating an integrated circuit device includes but is not limited to accepting first control information with a first sub-level module included in a first-level module of the integrated circuit device; sending the first control information with the first sub-level module to a second sub-level module included in the first-level module; sending the first control information with the second sub-level module to an interconnection network included in the integrated circuit device; and sending the first control information with the interconnection network to the first-level module or a second-level module included in the integrated circuit device.

In one aspect, a machine-readable medium that provides instructions, which when executed by a machine, cause said machine to perform operations, includes instructions for operations including but not limited to accepting first control information with a first sub-level module included in a first-level module of the integrated circuit device; sending the first control information with the first sub-level module to a second sub-level module included in the first-level module; sending the first control information with the second sub-level module to an interconnection network included in the integrated circuit device; and sending the first control information with the interconnection network to the first-level module or a second-level module included in the integrated circuit device.

In one aspect, a computer system includes but is not limited to a processor; and a memory operably coupleable to the processor; and an integrated circuit device operably coupleable to the processor, wherein the integrated circuit device includes a first-level module configurable to receive and transmit control information, said first level module including a first sub-level module, a second sub-level module operably coupleable to the first sub-level module, and a third sub-level module operably coupleable to the second module, and a second-level module operably coupleable to the first-level module.

In one or more various aspects, related articles, systems, and devices include but are not limited to circuitry, programming, electro-mechanical devices, or optical devices for effecting the herein-referenced method aspects. The circuitry, programming, electro-mechanical devices, or optical devices can be virtually any combination of hardware, software, and firmware configured to effect the herein-referenced method aspects.

In addition to the foregoing, various other method, device, and system aspects are set forth and described in the teachings, such as the text (e.g., claims or detailed description) or drawings, of the present disclosure.

The foregoing is a summary and thus contains, by necessity, simplifications, generalizations and omissions of detail; consequently, those skilled in the art will appreciate that the summary is illustrative only and is not intended to be in any way limiting. Other aspects, features, and advantages of the devices, processes, or other subject matter described herein will become apparent in the teachings set forth herein.

BRIEF DESCRIPTION OF THE DRAWINGS

FIG. 6 shows uses of part of an address field for instance numbers;

FIG. 7 shows a table illustrating some exemplary assignments for the instance numbers of FIG. 6;

Figure 1:
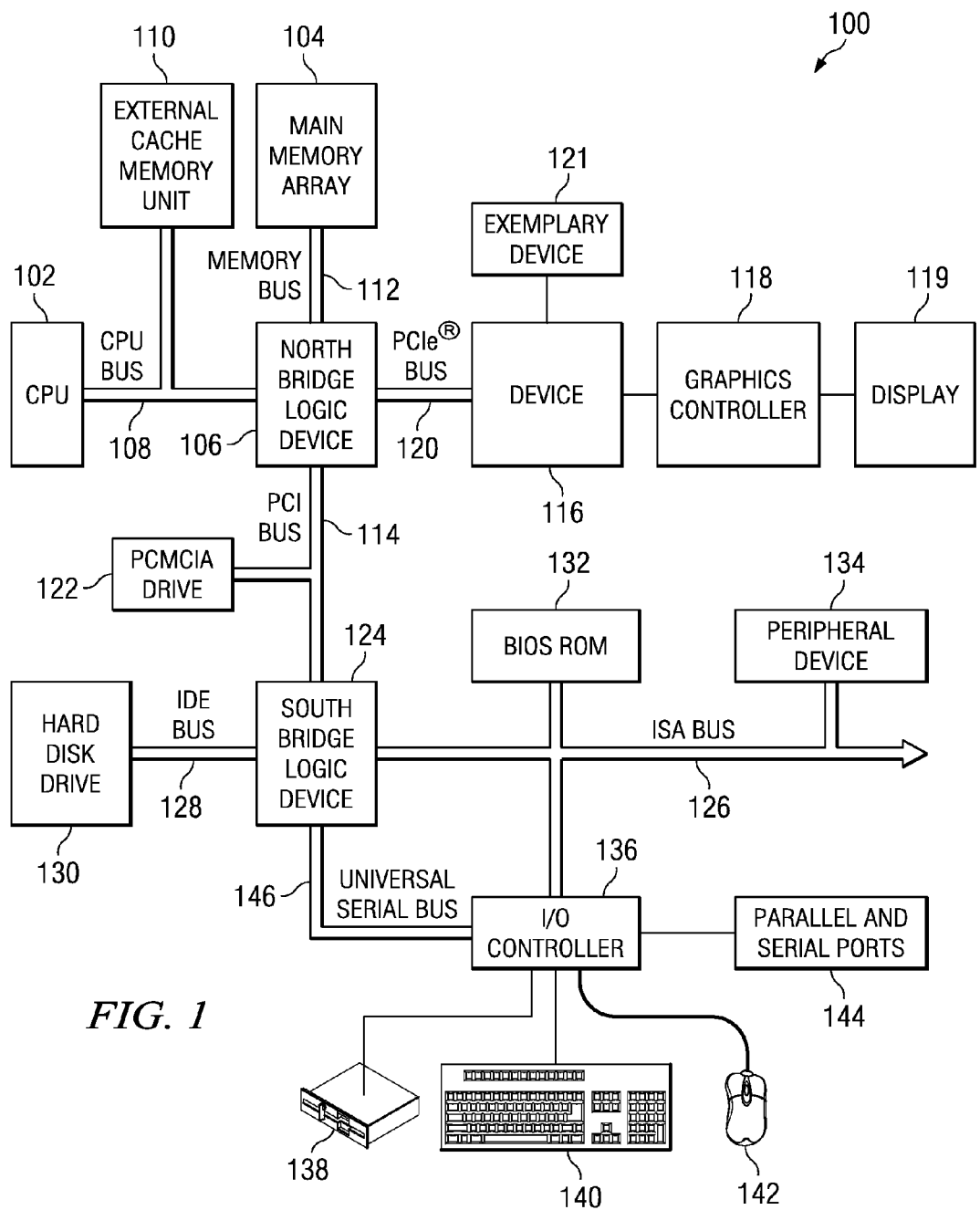
FIG. 1 shows a computer system that includes an integrated circuit device in accordance with some embodiments of the invention.

While the invention is subject to various modifications and alternative forms, specific embodiments thereof are shown by way of example in the drawings and the accompanying detailed description. It should be understood, however, that the drawings and detailed description are not intended to limit the invention to particular embodiments. This disclosure is instead intended to cover all modifications, equivalents, and alternatives falling within the scope of the present invention as defined by the appended claims.

NOTATION AND NOMENCLATURE

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the terms "couple," "couples," "coupleable," or "coupling" are intended to mean either an indirect or direct electrical or wireless connection. Thus, if a first device couples to a second device, that connection may be through a direct electrical or wireless connection, or through an indirect electrical or wireless connection by means of other devices and connections.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Turning now to FIG. 1, a computer system that includes an integrated circuit device in accordance with some embodiments of the invention is shown. The exemplary computer system 100 includes a PCIe®-compatible device 116. (The PCIe® architecture is defined in Peripheral Component Interconnect Special Interest Group ("PCI-SIG"), "PCI Express® Base Specification, Revision 2.0," Dec. 20, 2006; PCI-SIG, "PCI Express™ Base Specification," Revision 1.1, Mar. 28, 2005; PCI-SIG, "Errata for the PCI Express Base Specification, Revision 1.1," Feb. 8, 2007; and PCI-SIG, "PCI Local Bus Specification," Revision 3.0, Feb. 3, 2004, all of which specification documents are incorporated by reference herein.) The device 116 is exemplary of one or more devices that may be included in the exemplary computer system 100 and may include embodiments of the invention. The device 116 may include one or more modules for performing various functions, each module may include one or more sub-level modules, and each module and sub-module may include one or more registers for control information pertaining to the device 116 and to devices operably coupled to the device 116. Control information may include without being limited to, for example, information that directs a device to accept data information such as video information or audio information at a specified rate, information that specifies screen size, information that specifies refresh rate, and information that turns a device on or off or otherwise manages power consumption. Herein, "control information" includes status information and requests for status information. The device 116 may couple, for example, the graphics controller 118 and the display 119 to the PCIe® bus 120. The device 116 may also couple one or more other exemplary devices such as the exemplary device 121 to the PCIe® bus 120. The exemplary device 121 may include but are not limited to, for example, a digital video disc ("DVD") player, a compact disc ("CD") player, a printer, a scanner, a camera, a camcorder, a memory stick, a hard-drive/solid state music player, a keyboard, or a mouse. The device 116 may accommodate the hot-plugging of devices during operation of the exemplary computer system 100. Embodiments of the invention are not limited to the device 116 described herein. An integrated circuit device or a computer system component that incorporates an embodiment of the invention may be used in a variety of computing systems, not limited to the computer system 100 depicted in FIG. 1.

The exemplary computer system 100 may be configured in any number of ways, including as a personal digital assistant (PDA), SmartPhone, laptop unit, a desktop unit, a network server, cell phone or any other configuration. The computer system 100 may include a central processing unit (CPU) 102 coupled to a main memory array 104 and to a variety of other peripheral computer system components through an integrated bridge logic device ("North bridge logic device") 106. The CPU 102 may comprise, for example, a processor belonging to the Intel® Pentium® Dual Core or Core™2 families of processors, or a processor featuring the PowerPC® architecture. The CPU 102 may couple to the North bridge logic device 106 by way of a CPU bus 108, or the North bridge logic device 106 may be integrated into the CPU 102. An external cache memory unit 110 further may couple to the CPU bus 108 or directly to the CPU 102. The main memory array 104 may couple to the North bridge logic device 106 through a memory bus 112. The North bridge logic device 106 may couple the CPU 102 and main memory array 104 to the peripheral devices in the system through a Peripheral Component Interconnect (PCI) bus 114 or other expansion bus. The computer system 100 may include a graphics controller 118 that may couple to the North bridge logic device 106 through an expansion bus, e.g., the PCIe® bus 120 or through the PCI bus 114. The graphics controller 118 may embody a typical graphics accelerator generally known in the art to render three-dimensional data structures on display 119. The display 119 may comprise any suitable electronic display device upon which an image or text can be represented. As shown in FIG. 1, the graphics controller 118 is coupled to the North bridge logic device 106 through the device 116 and the PCIe® bus 120, as is the exemplary device 121.

The computer system 100 optionally may include a Personal Computer Memory Card International Association (PCMCIA) drive 122 coupled to the PCI bus 114. Another bridge logic device ("South bridge logic device") 124 typically may couple the PCI bus 114 to other secondary expansion buses. In FIG. 1, the South bridge logic device 124 couples the PCI bus 114 to an Industry Standard Architecture (ISA) bus 126 and to an Integrated Drive Electronics (IDE) bus 128. In FIG. 1, the IDE bus 128 shown in FIG. 1 couples to Hard Disk Drive (HDD) 130. Various ISA-compatible devices are shown coupled to the ISA bus 126, including a BIOS ROM 132. A peripheral device 134 such as a disk drive may also be coupled to the ISA bus 126. The South bridge logic device 124 supports an input/output (I/O) controller 136 that operatively couples to basic input/output devices such as a floppy disk drive 138, a keyboard 140, a mouse 142, general purpose parallel and serial ports 144, and various input switches such as a power switch and a sleep switch (not shown). The I/O controller 136 may couple to the South bridge logic device 124 by way of the ISA bus 126 in FIG. 1. A universal serial bus 146 may provide an additional connection between the I/O controller 136 and South bridge logic device 124.

Figure 2:
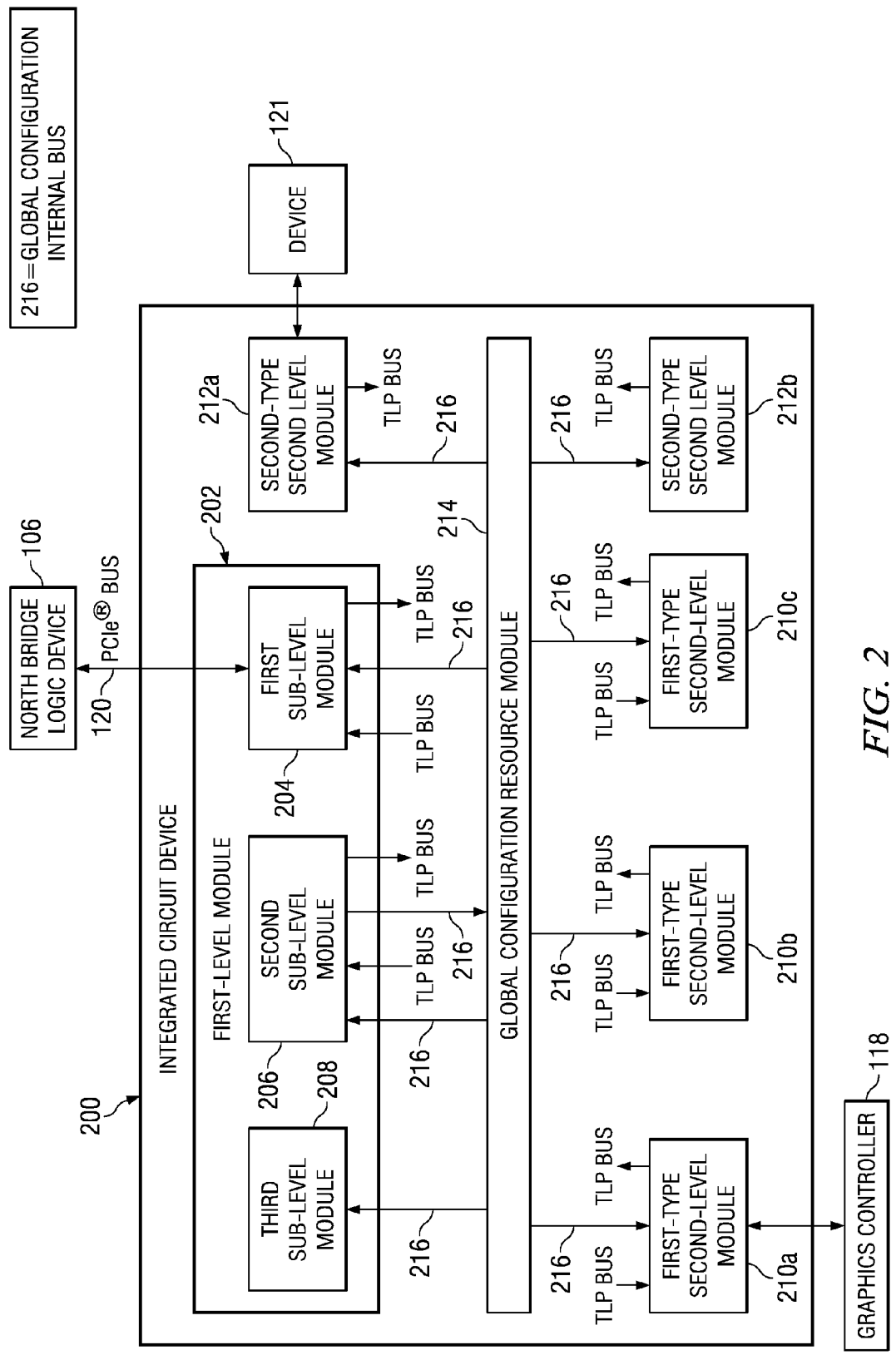
FIG. 2 shows a block diagram of an exemplary integrated circuit device that contains some embodiments of the invention.

Turning now to FIG. 2, a block diagram of an exemplary integrated circuit device that contains some embodiments of the invention is illustrated. The exemplary integrated circuit device 200, a device typical of the Texas Instruments XIO3000 family of integrated circuit devices, may be included in the device 116 of FIG. 1. As may be seen from the description of the exemplary integrated circuit device 200 of FIG. 2 below, the device 200 is organized hierarchically. That is, each of the modules of device 200 serves as a pathway for control information to configuration sub-modules associated with them. Here, the modules 204, 206, and 208 serve as pathways to the configuration sub-modules 304, 318, and 328, respectively (see FIGS. 2, 3*a*, 3*b*, and 3*c*). Further, the first-type second-level modules 210 serve as pathways to the configuration sub-modules 408 (see FIGS. 2 and 4) and second-type second-level modules 212 serve as pathways to the configuration sub-modules 506 (see FIGS. 2 and 5). The following discussion of the operation of the exemplary integrated circuit device 200 makes reference to the general illustration of FIG. 2 and to the more detailed depictions of FIGS. 3*a*, 3*b*, 3*c*, 4, and 5 as necessary.

The exemplary integrated circuit device 200 includes a first-level module 202. The first-level module 202 includes a first sub-level module 204, a second sub-level module 206, and a third sub-level module 208. The exemplary integrated circuit device 200 also includes three exemplary first-type second-level modules 210*a*, 210*b*, and 210*c* and two exemplary second-type second-level modules 212*a* and 212*b*. Further exemplary second-level modules would have similar consecutively numbered labels, such as second-type second-level module 212*c*. Each of the modules 202 (or sub-level module included with the module 202, such as modules 204, 206, and 208), 210, and 212 may include configuration sub-modules, and each configuration sub-module may include one or more registers for control information. (Configuration sub-modules and registers are described below in connection with FIGS. 3*a*, 3*b*, 3*c*, 4, and 5.) In some embodiments of the invention, registers in separate configuration sub-modules of a particular module comprise a single, contiguous address space such that those registers may be identified collectively with a single address. Any single module that includes in distinct configuration sub-modules such registers for control information that may be identified collectively with a single address, such as the first-level module 202, any first-type second-level module 210, and any second-type second-level module 212, may be termed a "configuration space." The exemplary integrated circuit device 200 further includes a global configuration resource module 214. The global configuration resource module 214 includes an interconnection network that operably couples the first-level module 202 to the first-type second-level modules 210 and to the second-type second-level modules 212 by a set of global configuration internal busses 216 to which the global configuration resource module 214 is operably coupled. The exemplary integrated circuit device 200 may also include one or more packet transport busses. In the exemplary integrated circuit device 200, the function of the packet transport busses is served by the transaction layer packet bus ("TLP bus"). Data flow to and from the TLP bus is indicated by arrows and labels but the TLP bus itself is not shown to avoid unnecessary graphical complexity. In FIG. 2 and in all other figures in which arrows are used to signify operable couplings between items, the directions of the arrows generally indicate the direction of information flow for a transaction such as a write or a read, as described herein. Information may flow in the coupling may be in the direction opposite the indicated directed, however, as for completions of transactions, as described herein.

In accordance with some embodiments of the invention, a first-type second-level module 210 is a module that includes one or more PCIe®-compatible ports that permit a device compatible with the PCIe® architecture to be operably coupled to the exemplary device 200 via a PCIe® bus operably coupled to one of the PCIe®-compatible ports. Where the device 116 of FIG. 1 includes the exemplary device 200, a PCIe®-compatible device may be thus be coupled to the PCIe® bus 120 via the exemplary device 200. In such embodiments, the module 210 serves as a PCIe®-PCIe® family bridge. FIG. 2 shows as an example the graphics controller 118 of FIG. 1 operably coupled to the module 210*a*, but the exemplary device 121 could also be operably coupled to the module 210*a*. Where the module 210*a* includes a PCIe®-compatible port, the graphics controller is operably coupled to the module 210*a* via a PCIe® bus operably coupled to the PCIe®-compatible port. In accordance with some other embodiments of the invention, a first-type second-level module 210 is a module that includes one or more PCI®-compatible ports, permitting PCI®-compatible devices to be operably coupled to the exemplary device 200 via a PCI® bus operably coupled to one of the PCI® ports. In some embodiments of the invention, the exemplary integrated device 200 may include, among second-level modules, one or more first-type second-level modules 210 but no second-type second-level modules 212. Such a device 200 may be termed a switch in PCIe® terminology.

In accordance with some embodiments of the invention, a second-type second-level module 212 is a module that includes one or more ports that permit one or more devices with interfaces compatible with architectures other than the PCIe® architecture, such as devices whose interfaces conform to the Universal Serial Bus ("USB") interface standard, or to the IEEE-1394 serial bus interface standard (e.g., the FIREWIRE® peripheral standard of Apple Computer, Inc.). An exemplary second-type second-level module 212 is operably coupleable to devices including but not limited to devices such as the graphics controller 118 or one or more exemplary devices 121 of FIG. 1. FIG. 2 shows as an example the exemplary device 121 operably coupled to the module 212*a*. As described in connection with FIG. 1, the exemplary device 121 may include a device such as a DVD player, a CD player, a printer, a scanner, a camera, a camcorder, a memory stick, a hard-drive/solid state music player, a keyboard, or a mouse. In some embodiments of the invention, the exemplary device 200 may include, among second-level modules, one or more second-type second-level modules 212 but no first-type second-level modules 210.

The exemplary integrated circuit device 200 or the first-level module 202, the sub-level modules 204, 206, and 208, the first-type second-level modules 210, and the second-type second-level modules 212 may be implemented in a number of ways. These implementations may include but are not limited to application-specific integrated circuits ("ASICs"), programmable logic devices ("PLDs"), and field programmable gate arrays ("FPGAs").

The first-level module 202 is operably coupled to one or more integrated circuit devices that send may send control information to and receive control information from the exemplary integrated circuit device 200. The first-level module 202 may receive control information formatted in packets that are to be sent along to sub-level modules included in the first-level module 202, to first-type second-level modules 210, or to second-type second-level modules 212 to set or change the configuration of those modules. For clarity, the first-level module 202 of FIG. 2 is depicted in greater detail in FIGS. 3a, 3b, and 3c, an exemplary first-type second-level module 210 is shown in greater detail in FIG. 4, and an exemplary second-type second-level module 212 is illustrated in greater detail in FIG. 5.

Figure 3A:
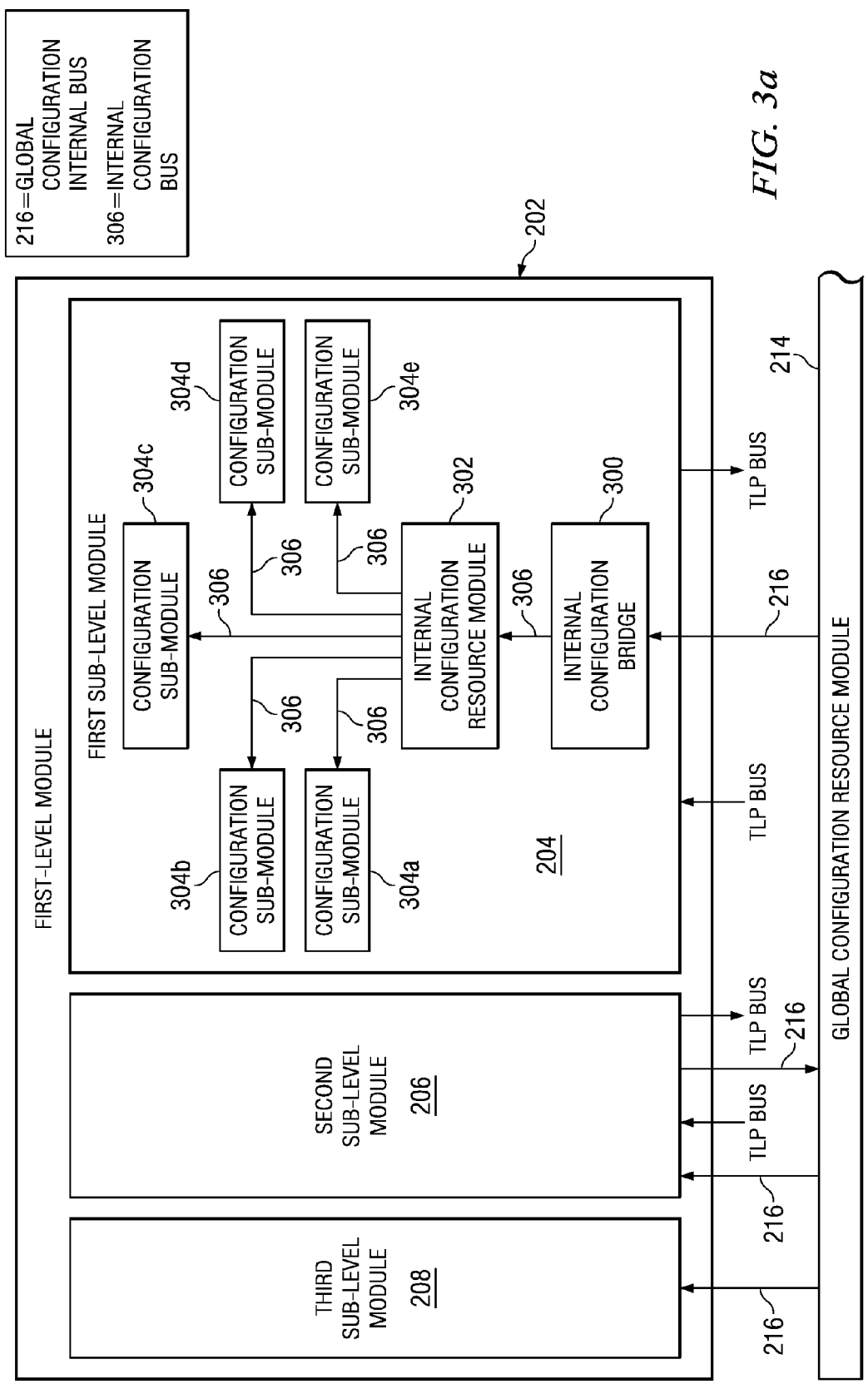
FIG. 3a shows a block diagram of a first sub-level module in accordance with some embodiments of the integrated circuit device of FIG. 2.
Figure 3B:
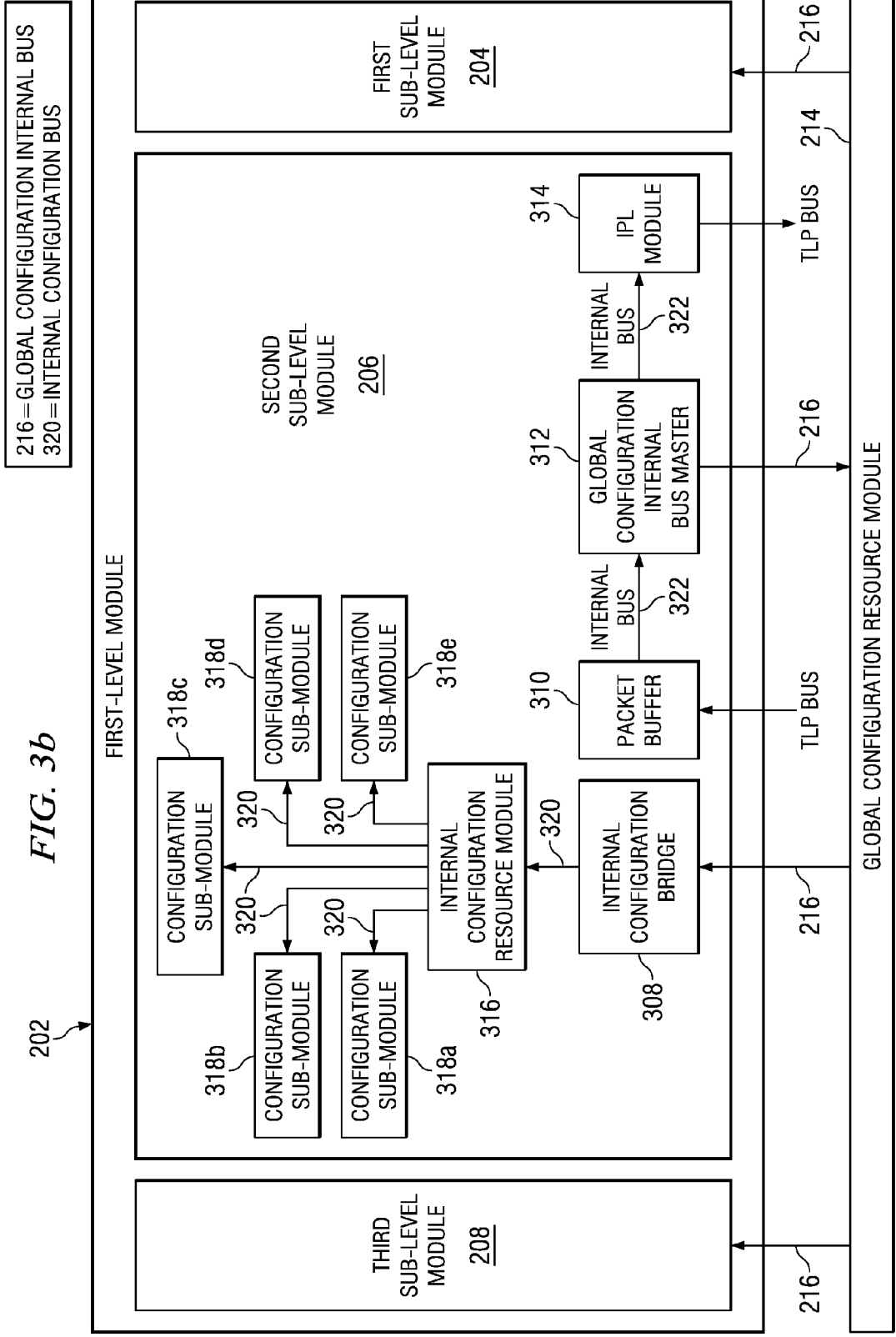
FIG. 3b shows a block diagram of a second sub-level module in accordance with some embodiments of the integrated circuit device of FIG. 2.
Figure 3C:
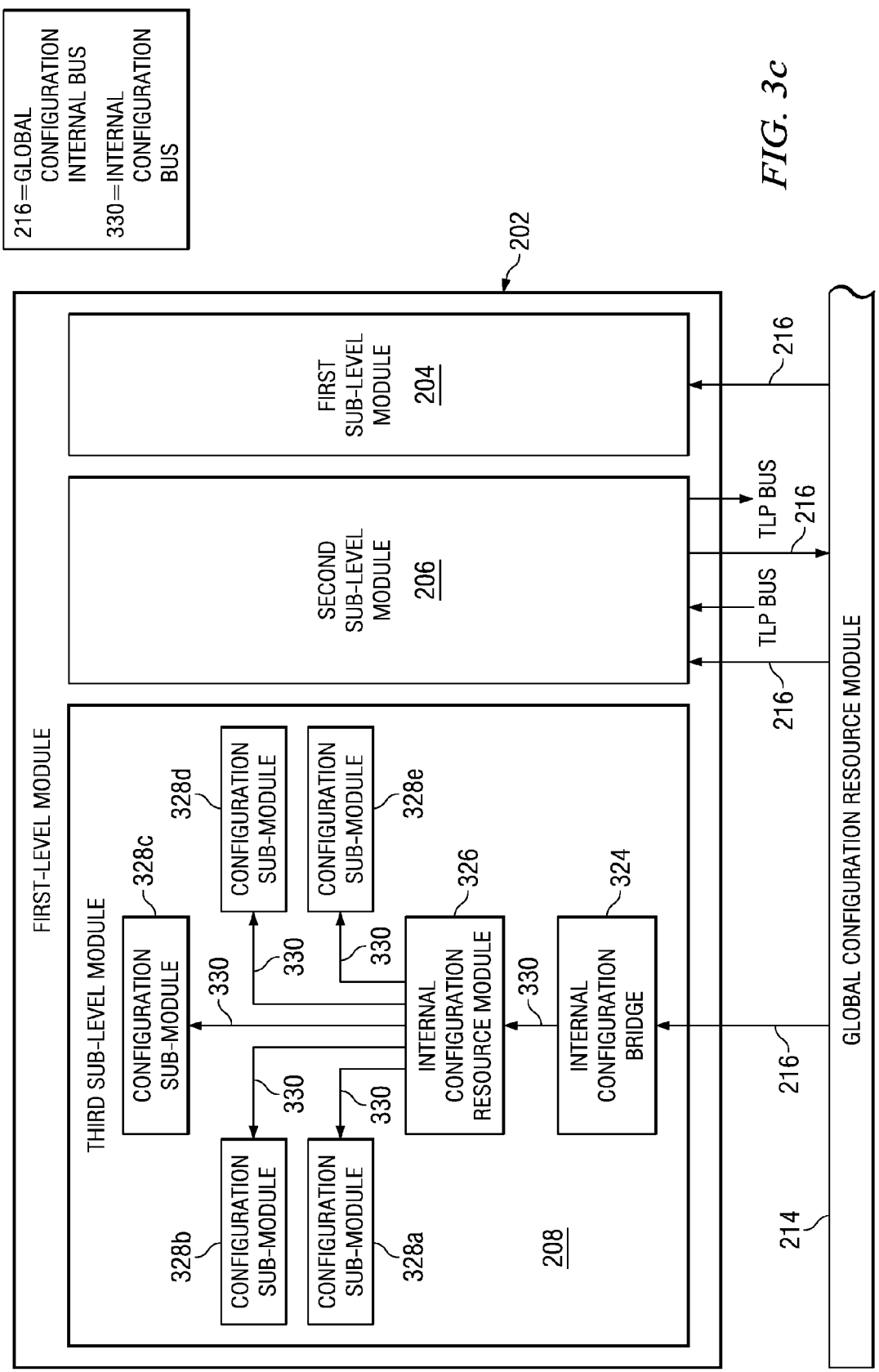
FIG. 3c shows a block diagram of a third sub-level module in accordance with some embodiments of the integrated circuit device of FIG. 2.

Turning now to FIGS. 3a, 3b, and 3c, block diagrams of the first-level module 202 in accordance with some embodiments of the integrated circuit device 200 of FIG. 2 are shown. The first-level module 202 of FIG. 2 includes three sub-level modules: the first sub-level module 204, the second sub-level module 206, and the third sub-level module 208.

Turning now to FIG. 3a, the first sub-level module 204 includes an internal configuration bridge 300, an internal configuration resource module 302 and configuration sub-modules 304. Each configuration sub-module 304 includes one or more configuration registers that, taken together, make up part of the configuration space of the module 202 in which the first sub-level module 204 is included. FIG. 3a depicts exemplary configuration sub-modules 304a, 304b, 304c, 304d, and 304e. The internal configuration bridge 300, the internal configuration resource module 302 and the configuration sub-modules 304 are operably coupled via a set of internal configuration busses 306. The first sub-level module 204 is operably coupled to the global configuration resource module 214 via the internal configuration bridge 300 and a global configuration internal bus 216.

The first sub-level module 204 performs those functions specific to communications between the exemplary integrated circuit device 200 and a device or devices operably coupled to a processor such as the CPU 102 of FIG. 1. In various implementations, the communications functions of the first sub-level module 204 should typically not need to be edited for different members of the device family to which the exemplary integrated circuit device 200 belongs, such as the XIO3000 family of device, because the communications functions are typically the same for all members of the family. This design permits the re-use of programming code among different devices of the same family featuring implementations of the invention, where such programming code is implemented in one or more ASICs, PLDs, or FPGAs, or other implementations as described above.

Turning now to FIG. 3b, the second sub-level module 206 includes an internal configuration bridge 308, a packet buffer 310, a global configuration internal bus master 312, an ingress port logic ("IPL") module 314, an internal configuration resource module 316, and configuration sub-modules 318. Each configuration sub-module 318 includes one or more configuration registers that, taken together, make up part of the configuration space of the module 202 in which the second sub-level module 206 is included. FIG. 3b depicts exemplary configuration sub-modules 318a, 318b, 318c, 318d, and 318e. The internal configuration bridge 308, the internal configuration resource module 316 and the configuration sub-modules 318 are operably coupled via a set of internal configuration busses 320. The packet buffer 310, the global configuration internal bus master 312, and the IPL module 314 are operably coupled via internal busses 322. The second sub-level module 206 is operably coupled to the global configuration resource module 214 via the internal configuration bridge 308 and the global configuration internal bus master 312. The second sub-level module 206 is operably coupled to the TLP bus via the packet buffer 310 and the IPL module 314.

The second sub-level module 206 controls functions for all of the modules of first-level module 202, including itself, the first sub-level module 204 and the third sub-level module 208. The second sub-level module 206 also controls functions that apply generally to the exemplary integrated circuit device 200. These functions may include but are not limited to control of general-purpose input/output ("I/O") pins, control of power management for the entire exemplary device 200, or storage and reporting of device and vendor identification numbers associated with the exemplary device 200. Such functions may be described as "global" because they apply globally to the exemplary device 200. Such global functions may differ among different design implementations of similar exemplary devices 200. Software, firmware, or hardware used to implement such functions may be partially re-used among different design implementations, but where the functions differ, the software, firmware, of hardware implementations among the different design implementations must differ accordingly.

Further, the second sub-level module 206 controls functions required to effect communications between the first sub-level module 204 and (1) the configuration sub-modules 304 of the first sub-level module 204, the configuration sub-modules of the second sub-level module 318, and the configuration sub-modules 328 of third sub-level module 208; (2) the configuration sub-modules 408 of any first-type second-level modules 210; and (3) the configuration sub-modules 506 of any second-type second-level modules 212 present in the exemplary device 200. Such functions are typically the same for any actual modules 210 and 212 present and therefore typically do not differ among the members of a family of devices 200 such as the XIO3000 family. An example of such a function includes routing control information received from the CPU 102 of FIG. 1 via the first sub-level module 204, the TLP bus, and the packet buffer 310, to the global configuration internal bus master 312. The global configuration internal bus master 312 may convert the control information into a transaction on a global configuration internal bus 216. The global configuration internal bus master 312 may send the transaction via a global configuration internal bus 216 and the global configuration resource module 214 may distribute the global configuration internal bus transaction to the sub-modules 204, 206, and 208 of the first-level module 202; all first-type second-level modules 210 present; and all second-type second-level modules 212 present, as required. The global configuration internal bus master 312 may receive any required response via a the global configuration resource module 214 and a global configuration internal bus 216 and may route it back to the first sub-level module 204 via the IPL module 314 and the TLP bus to the first sub-level module 204, which may route it out of the exemplary device 200 to the CPU 102.

Turning now to FIG. 3c, the third sub-level module 208 includes an internal configuration bridge 324, an internal configuration resource module 326, and configuration sub-modules 328. Each configuration sub-module 328 includes one or more configuration registers that, taken together, make up part of the configuration space of the module 202 in which the third sub-level module 208 is included. Taken together, the configuration registers of the configuration sub-modules 304 of FIG. 3a, the configuration sub-modules 318 of FIG. 3b, and the configuration sub-modules 328 of FIG. 3c make up the configuration space of first-level module 202. FIG. 3c shows exemplary configuration sub-modules 328a, 328b, 328c, 328d, and 328e. The internal configuration bridge 324, the internal configuration resource module 326 and the configuration sub-modules 328 are operably coupled via a set of internal configuration busses 330. The third sub-level module 208 is operably coupled to the global configuration resource module 214 via the internal configuration bridge 324 and a global configuration internal bus 216.

The third sub-level module 208 may control functions specific to the first-type second-level modules 210 present in a specific implementation of an exemplary integrated circuit device 200. In an exemplary device 200 that includes one or more first-type second-level modules 210 operably coupled to PCIe® busses, the software, firmware, or hardware of the third sub-level module 208 must specifically implement communications between the first sub-level module 204 and the particular one or more first-type second-level modules 210 present. For example, where first sub-level module 204 is operably coupled to a bus such as the PCIe® bus 120 of FIG. 1, the third sub-level module 208 may implement specific functions required for communication between the first sub-level module 204 and those one or more first-type second-level modules 210 coupled to the additional PCIe® busses.

Further, the third sub-level module 208 may control functions specific to the second-type second-level modules 212 present in a specific implementation of an exemplary integrated circuit device 200 that does not implement any first-type second-level modules 210 In such an exemplary device 200 that includes one or more second-type second-level modules 212 operably coupled to non-PCIe® interfaces such as USB-compatible interfaces or IEEE-1394-compatible interfaces, for example, the software, firmware, or hardware of the third sub-level module 208 must specifically implement communications between first sub-level module 204 and the particular one or more second-type second-level modules 212 present. For example, where first sub-level module 204 is operably coupled to a bus such as the PCIe® bus 120 of FIG. 1, the third sub-level module 208 may implement specific functions required for communication between the first sub-level module 204 and those one or more second-type second-level modules 212 coupled to USB or IEEE-1194 interfaces.

Figure 4:
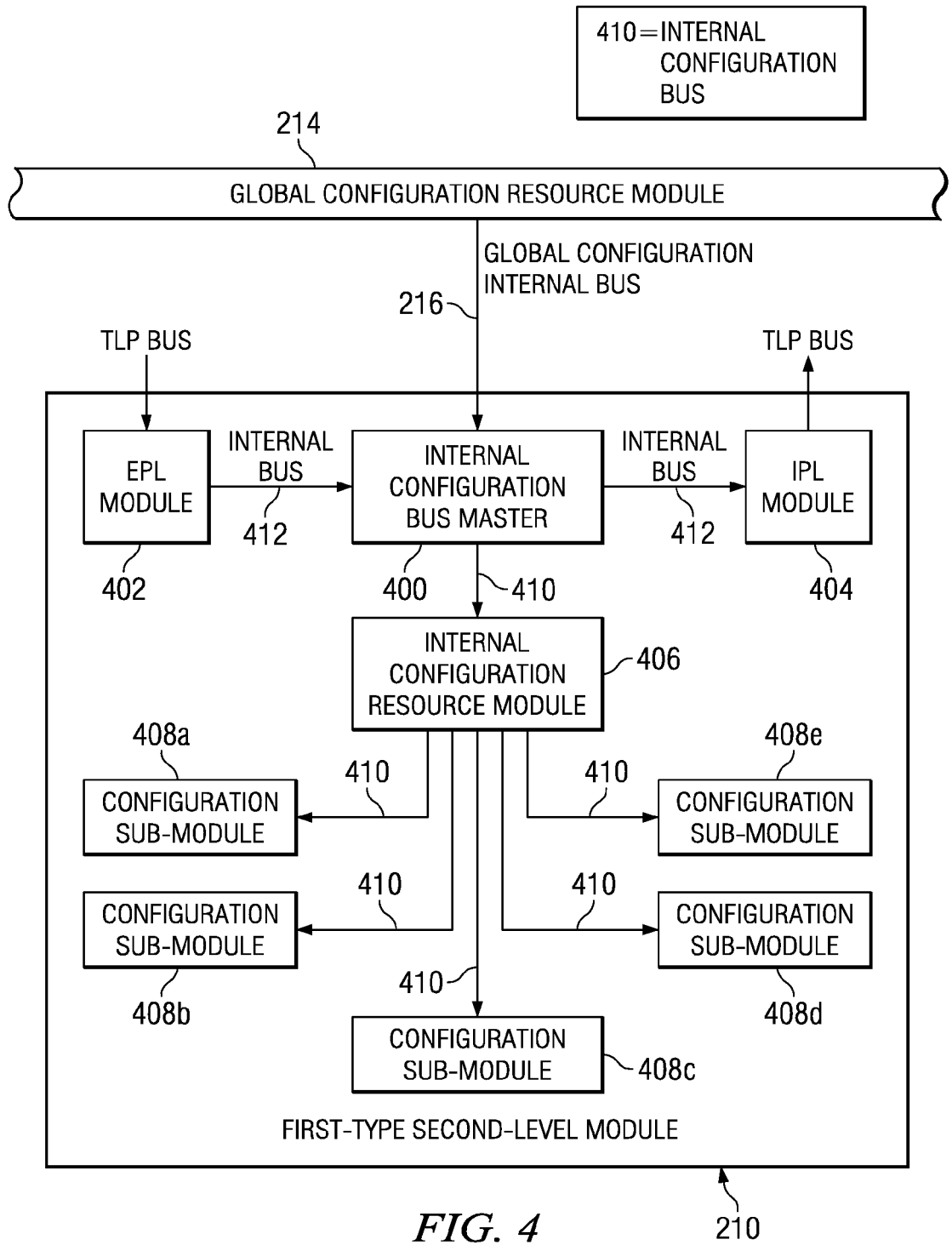
FIG. 4 shows a block diagram of some exemplary first-type second-level modules in accordance with embodiments of the exemplary integrated circuit device of FIG. 2.

Turning now to FIG. 4, a block diagram of some exemplary first-type second-level modules in accordance with embodiments of the exemplary integrated circuit device of FIG. 2 is shown. In FIG. 4, some exemplary first-type second-level modules 210 of the exemplary integrated circuit device 200 are illustrated in greater detail than in FIG. 2. The exemplary first-type second-level module 210 may include an internal configuration bus master 400, an egress port logic ("EPL") module 402, an IPL module 404, an internal configuration resource module 406, and configuration sub-modules 408. Each configuration sub-module 408 may include one or more configuration registers that, taken together, make up the configuration space of the module 210. FIG. 4 shows configuration sub-modules 408a, 408b, 408c, 408d, and 408e. The internal configuration bus master 400, the internal configuration resource module 406 and the configuration sub-modules 408 may be operably coupled via a set of internal configuration buses 410. The internal configuration bus master 400 may be operably coupled to the EPL module 402 via an internal bus 412, and the internal configuration bus master 400 may be operably coupled to the IPL module 404 via a second internal bus 412. The exemplary first-type second-level module 210 may be operably coupled to the global configuration resource module 214 via the internal configuration bus master 400 and a global configuration internal bus 216.

Figure 5:
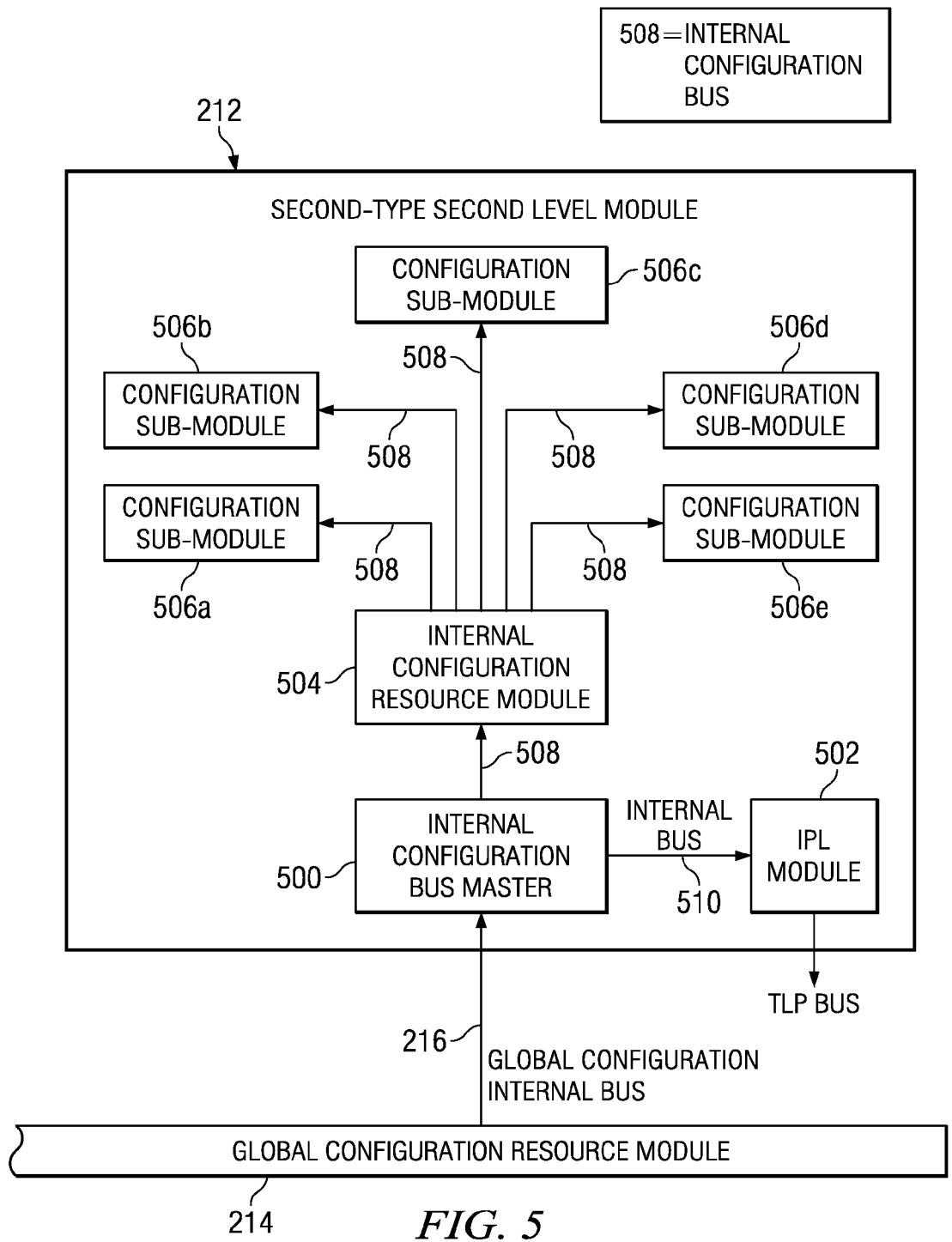
FIG. 5 shows a block diagram of some exemplary second-type second-level modules in accordance with embodiments of some exemplary integrated circuit devices of FIG. 2 is shown.

Turning now to FIG. 5, a block diagram of some exemplary second-type second-level modules in accordance with embodiments of some exemplary integrated circuit devices of FIG. 2 is shown. In FIG. 5, some exemplary second-type second-level modules 212 of the exemplary integrated circuit device 200 are depicted in greater detail than in FIG. 2. The exemplary second-type second-level module 212 may include internal configuration bus master 500, an IPL module 502, an internal configuration resource module 504, and configuration sub-modules 506. Each configuration sub-module 506 may includes one or more configuration registers that, taken together, make up the configuration space of the module 212. FIG. 5 depicts configuration sub-modules 506a, 506b, 506c, 506d, and 506e. The internal configuration bus master 500, internal configuration resource module 504 and the configuration sub-modules 506 may be operably coupled via a set of internal configuration buses 508. The internal configuration master 500 may be operably coupled to the IPL module 502 via an internal bus 510. The exemplary second-type second-level module 212 may be operably coupled to the global configuration resource module 214 via the internal configuration bus master 500 and a global configuration internal bus 216.

The items described herein in connection with FIGS. 2, 3, 4, and 5 may be labeled with names consistent with PCIe® architecture terminology. The first-level module 202 may be called a function 0 module or an upstream port module. The first-type second-level module 210 may be called a downstream port module. The second-type second-level module 212 may be called an endpoint module.

Referring now to the overall operation of the exemplary integrated circuit device 200, control information is typically processed by integrated circuit devices such as the exemplary integrated circuit device 200 by means including "write" and "read" transactions. A write is an operation to send control information from a processor to one or more configuration sub-modules, such as configuration sub-modules 304, 318, 328, 408, or 506 (see FIGS. 3a, 3b, 3c, 4, and 5). A read is an operation by which a processor requests control information from one or more configuration sub-modules (such as configuration sub-modules 304, 318, 328, 408, or 506) and accepts the information that those configuration sub-modules return. Writes and reads are executed according to cycles of a system clock that is used to regulate the operation of the device. The global configuration internal bus transactions described herein include writes and reads.

In the exemplary integrated circuit device 200 of FIG. 2, writes are sent by a processor such as the CPU 102 of FIG. 1 for reasons that include setting or changing the configurations of modules such as the modules 202, 210, and 212 of FIG. 2 by sending control information to them. Such writes may be sent, for example, to the exemplary second-type second-level module 212a when the speed at which a device is to receive data information must be set or reset, where the device is operably connected to the exemplary second-type second-level module 212a. Writes may be sent to the modules via, for example, the global configuration internal busses 216. Writes sent by the global configuration internal busses 216 take a single clock cycle. If a module to which a write is sent cannot respond immediately to another request following the current write, e.g., because it is busy performing some other operation such as a previously sent write request, then the module will indicate that it is not ready for the next request. The global configuration resource module 214 may collect these indications, aggregate them, and send the aggregated indications to the global configuration internal bus master 312 of FIG. 3b. Once all modules can accept further requests, the global configuration internal bus master 312 may issue a further request. In each module, the master or bridge issues the write via an internal configuration resource module on internal configuration busses to configuration sub-modules within the module. For example, if any of the configuration sub-modules 408a, 408b, 408c, 408d, or 408e of a first-type second-level module 210 cannot accept another request after the current one, that configuration sub-module will indicate that it is not ready for the next request. The internal configuration resource module 406 collects all such indications and sends an aggregate of them to the internal configuration bus master 400. Once all the configuration sub-modules 408a, 408b, 408c, 408d, or 408e can accept the next request, the internal configuration bus master 400 may issue the next request.

A processor such as the CPU 102 of FIG. 1 may send a read to determine the configurations of modules such as modules 202, 210, and 212 by reading control information from them. After receiving a request for control information, the global configuration internal bus master 312 sends a read to modules via global configuration internal busses 216. A read is sent in a single clock cycle, but the information requested may not be returned immediately. If a module cannot immediately return the information requested, the module will insert wait states on the relevant global configuration internal bus 216 until the control information to be returned is ready to be read. Such wait states tell the global configuration internal bus 216 that it must wait for the returning control information. The global configuration resource module 214 collects the returning control information from each module as each module indicates that the return control information is valid. The global configuration resource module 214 aggregates the returned information from all of the modules providing such control information as a read completion packet and provides a single return back to the requesting processor via a global configuration internal bus 216, the IPL module 314, the TLP bus, and the first sub-level module 204. The configuration sub-modules respond to the read request with control information and indications that the control information is valid. For each bit in the address to which the read request is directed but which a particular configuration sub-module does not own, that is, which does not correspond to that particular configuration sub-module, that configuration sub-module responds with zeroes. If a particular configuration sub-module cannot respond immediately to any bit that it does own, the configuration sub-module indicates that the control information is not ready until it can deliver valid control information. An internal configuration resource module collects all returned values from the configuration sub-modules and aggregates them into a single value for return to the internal configuration bus master. For example, referring to FIGS. 2 and 4, if the internal configuration bus master of the first-type second-level module 210b determines that a global configuration internal bus request is targeting the first-type second-level module 210b, the internal configuration bus master 400 issues wait states to the global configuration internal bus 216 and issues the read request via the internal configuration resource module 406 to the configuration sub-modules 408a, 408b, 408c, 408d, and 408e. When the configuration sub-modules 408a, 408b, 408c, 408d, and 408e are ready to return valid control information, the internal configuration resource module 406 aggregates the returned values into a single value for return to the internal configuration bus master 400.

A write is finished when the write request from the internal configuration bus master or bridge finishes. When the write is finished, the internal configuration bus master or bridge has information required to create a completion packet for the write. The internal configuration bus master or bridge creates the completion packet and sends it to the IPL module of the same module. The IPL module sends the completion packet via the TPL bus to the requesting processor. For instance, referring to FIGS. 1, 2, and 5, once a write targeting the second-type second-level module 212b is finished, the internal configuration bus master 500 creates a completion packet and sends it to the IPL module 502 of second-type second-level module 212b. The IPL module 502 sends the completion packet via the TPL bus and the first sub-level module 204 to the requesting processor, such as the CPU 102 of the exemplary computer system 100.

A read is finished when a global configuration internal bus master such as the global configuration internal bus master 312 of FIG. 3b has received all of the aggregate return data. When this has occurred, the global configuration internal bus master 312 may create a completion packet and send it to an IPL module such as the IPL module 314 of FIG. 3b. The IPL module 314 may then insert the completion packet into the information stream on a TLP bus to be routed to its appropriate destination, such as the CPU 102 of FIG. 1.

The global configuration internal bus transactions are received by the internal configuration bridge 300 of the module 204, the internal configuration bridge 308 of the module 206, and the internal configuration bridge 324 of the module 208, the internal configuration bus master 400 of the module 210, and the internal configuration bus master 500 of the module 212. Global configuration internal bus transactions may be broadcast or sent directly to a specific module or modules. Global configuration internal bus transactions include "instance numbers" to designate the modules to which the writes and reads are to be sent. Each module has an input connected to its internal configuration bus master or bridge that indicates an instance number associated with that module. This input may be implemented in hardware, such as a strapping input. When an internal configuration bus master or internal configuration bridge determines that a global configuration internal bus write transaction is targeting it by comparing the instance numbers of the transaction and the module to which the internal configuration bus master or internal configuration bridge belongs, the master or bridge accepts the write and the global configuration internal bus cycle ends. For example, referring to FIGS. 2 and 4, if the internal configuration bus master 400 of the first-type second-level module 210a determines that a global configuration internal bus transaction is targeting the first-type second-level module 210a, the internal configuration internal bus master 400 accepts the write and broadcasts the write via the internal configuration resource module 406 and the internal configuration busses 410 of first-type second-level module 210a to the configuration sub-modules 408a, 408b, 408c, 408d, and 408e. When the internal configuration bus master or the internal configuration bridge of a module receives a global configuration internal bus read request that includes the instance number of the module to which the master or bridge belongs, it issues wait states to the global configuration internal bus and issues the read request via the internal configuration busses to the configuration sub-modules within the module. The receiving masters or bridges may include the internal configuration bus masters 400 of the first-type second-level modules 210a, 210b, and 210c and the internal configuration bus masters 500 of the second-type second-level modules 212a and 212b of FIGS. 2, 4, and 5.

Instance numbers and address fields as used by some aspects of the invention are described below in connection with FIGS. 6, 7, and 8. Global configuration internal bus transactions include addresses that designate the modules to which the writes and reads are to be sent, such as the first-level module 202, the first-type second-level modules 210, and the second-type second-level modules 212. An address field in an address is a series of bits that specifies a location in a computing device. Each of the address bits is labeled according to its position in the series, with the labels running from "00" to "X" where X is one less than the number of positions in the address field. In some aspects of the invention, the upper positions of the address field are used to specify the address space of the module to which the global configuration internal bus writes and reads are being targeted. These upper positions taken together are called the "instance number." The use of instance numbers is described in more detail in connection with FIGS. 6 and 7. Addresses used in internal configuration bus transactions within modules such as the first-level module 202, the first-type second-level modules 210, and the second-type second-level modules 212, are taken from the remaining positions of the address field. These transactions include transactions directed to configuration sub-modules such as, for example, the configuration sub-modules 408a, 408b, 408c, 408d, and 408e of FIG. 4. Uses of the remaining position of the address field by some aspects of the invention are described in connection with FIG. 8.

Turning now to FIG. 6, uses of part of an address field for instance numbers are shown. In the context of the exemplary integrated circuit device 200, for any given write or read, exemplary uses of the upper positions for the instance number and the remaining bits for the internal configuration bus address in a 32-position address field is shown. Positions 28 through 31 may contain the instance number, while positions 00 through 27 may contain the internal configuration bus address. For example, an hexadecimal number 4'h0 be a four-bit instance number in positions 28 through 31 of an address field, and the hexadecimal number 28'001_3000 may be a 28-bit address in positions 00 through 27 of the address field. The instance number may be used by the internal configuration bus master of a module, such as a module 202, 210, or 212, to determine if a write or a read is targeted to that module. For example, the internal configuration bus master 400 of exemplary first-type second-level module 210a may use an instance number to determine if a write or a read is targeted to the first-type second-level module 210a.

Turning now to FIG. 7, a table illustrating some exemplary assignments for the instance numbers of FIG. 6 is shown. In the context of the exemplary integrated circuit device 200 of FIG. 2, instance number 4'h0 may be assigned to the first-level module 202, that is, the first sub-level module 204, the second sub-level module 206, and the third sub-level module 208 collectively (see FIGS. 2, 3a, 3b, and 3c). The instance number 4'h1 may be assigned to "second-type second-level function 1," which may be, for example, the second-type second-level module 212a (see FIGS. 2 and 5). The instance number 4'h2 may be assigned to "second-type second-level function 2," which may be, for example, the second-type second-level module 212b. (See FIGS. 2 and 5.) The instance number 4'h3 may be assigned to "second-type second-level function 3," and so on through the assignment of instance number 4'h7 to "second-type second-level function 7," where second-type second-level functions 3 through 7 may be second-type second-level modules similar to second-type second-level modules 212a and 212b but not illustrated in FIG. 2. In the exemplary assignments shown in FIG. 7, the instance number 4'h8 may be assigned to "first-type second-level port 0," which may be, for example, the first-type second-level module 210a (see FIGS. 2 and 4). The instance number 4'h9 may be assigned to "first-type second-level port 1," which may be, for example, the first-type second-level module 210b of FIGS. 2 and 4. The instance number 4'hA may be assigned to "first-type second-level port 2," which may be, for example, the first-type second-level module 210c (see FIGS. 2 and 4). The instance numbers 4'hB through 4'hE are assigned to "first-type second-level port 3" through "first-type second-level port 6" respectively, where first-type second-level ports 3 through 7 may be first-type second-level modules similar to first-type second-level modules 210a, 210b, and 210c, but not illustrated in FIG. 2. Finally, the instance number 4'hF may be used for writes and reads that are broadcast to all modules operably coupled to the global configuration internal bus 216. In the context of the exemplary integrated circuit device 200 of FIG. 2, the internal configuration bus master 400 of a first-type second-level module 210 such as first-type second-level module 210a would determine that a write or a read with the instance number 4'h8 is targeted at the first-type second-level module 210a (see FIGS. 2 and 4). The internal configuration bus master 400 of first-type second-level module 210a would also determine that a write or a read with the instance number 4'hF, the broadcast instance number, is targeted at all first- and second-level modules including the first-type second-level module 210a.

Figures 8, 9:
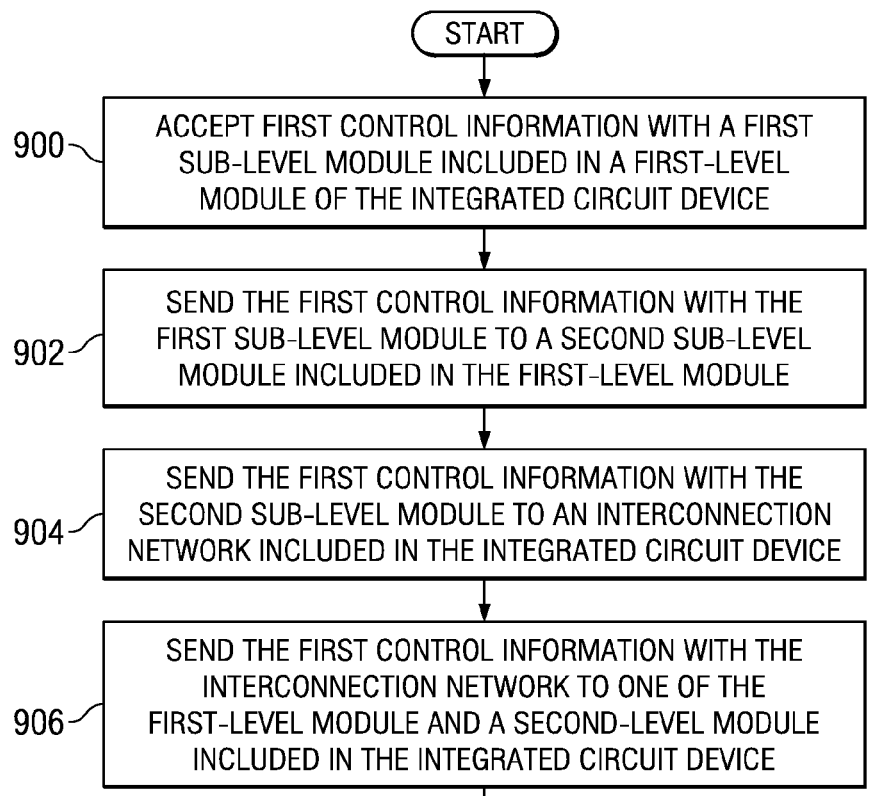
FIG. 8 shows a table depicting exemplary address mappings used in devices such as some exemplary integrated circuit devices of FIG. 2.
FIG. 9 shows a high-level flow chart depicting the steps of a method for processing control information.

Turning now to FIG. 8, a table depicting exemplary address mappings used in devices such as some exemplary integrated circuit devices of FIG. 2 are shown. Such exemplary address mappings may be used in, for example, the XIO3000 family of devices, of which some exemplary integrated circuit devices 200 of FIG. 2 are members. The internal configuration bus address ranges of the table of FIG. 8 correspond to the internal configuration bus address space shown in the table of FIG. 6. The address ranges shown in and described in connection with FIG. 8 may specify the configuration registers within configuration sub-modules to which transactions are targeted, such as the configuration sub-modules 306, 318, 328, 408, and 506 (see FIG. 3a, 3b, 3c, 4, and 5) In the exemplary address range assignments illustrated in FIG. 8, the address range from 28'h001_0000 to 28'hFFF-FFFF may be used for first-type transactions. The address range from 28'h000_3000 to 28'h000_FFFF may be used for second-type transactions. The address range from 28'h000_2100 to 28'h000_2FFF may be reserved for future use. The address range from 28'h000_2000 to 28'h000_20FF may be used for third-type transactions. The address range from 28'h000_1200 to 28'h000_1FFF may be reserved for future use. The address range from 28'h000_1000 to 28'h000_11FF may be used for fourth-type transactions. The address range from 28'h000_0100 to 28'h000_0FFF may be used for fifth-type transactions. Finally, the address range from 28'h000_0000 to 28'h000_00FF may be used for sixth-type transactions. Other address ranges may be used in embodiments of the invention. Those skilled in the art will recognize that the various transactions of the exemplary address range assignments shown in FIG. 8 may include transactions compatible with the PCIe® architecture, such as transactions internally generated and consumed within a device, message transactions, memory mapped addressed transactions, PCI Extended configuration transactions, and PCI Base configuration transactions. Continuing the example described in connection with FIG. 7, in the context of the exemplary integrated circuit device 200 of FIG. 2, the internal configuration bus master 400 of a 210a (see FIGS. 2 and 4) could determine that a write or a read with an address in the range from 28'h000_0100 to 28'h000_0FFF is targeted to the configuration registers of the configuration sub-modules 408 of the first-type second-level module 210a that handle fifth-type transactions, where such fifth-type transactions may be, for example, PCI Extended configuration transactions.

Turning now to FIG. 9, a high-level flow chart depicting the steps of a method for processing control information is shown. The method depicted includes the operations 900, 902, 904, and 906. Operation 900 may include accepting first control information with a first sub-level module included in a first-level module of the integrated circuit device. For example, operation 900 may include accepting first control information with the first sub-level module 204 included in the first-level module 202 (see FIGS. 2 and 3a), from, for instance, the PCIe® bus 120 (see FIGS. 1 and 2). Operation 902 may include sending the first control information with the first sub-level module to a second sub-level module included in the first-level module. Continuing the example of operation 900, operation 902 may include sending the first control information with the first sub-module 204 to the second sub-level module 206 included in the first-level module 202 (see FIGS. 2, 3a, and 3b). Operation 904 may include sending the first control information with the second sub-level module to an interconnection network included in the integrated circuit device. Continuing the examples of operations 900 and 902, operation 904 may include sending the first control information with the second sub-module 206 to an interconnection network included in the global configuration resource module 214 (see FIGS. 2, 3a, and 3b). Operation 906 may include sending the first control information with the interconnection network to the first-level module or a second-level module included in the integrated circuit device. Continuing the example of operations 900, 902, and 904, operation 906 may include sending the first control information with the interconnection network included on the global configuration resource module 214 to the first-level module 202 or to one or more second-level modules 210 and 212, or to both the first-level module 202 and to one or more second-level modules 210 and 212.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for operating an integrated circuit device, comprising:
   accepting first control information with a first sub-level module included in a first-level module of the integrated circuit device;
   sending the first control information with the first sub-level module to a second sub-level module included in the first-level module;
   sending the first control information with the second sub-level module to an interconnection network included in the integrated circuit device;
   sending the first control information with the interconnection network to the first-level module or a second-level module included in the integrated circuit device.

2. The method of claim 1, wherein the first-level module includes a first-level plurality of configuration sub-modules distributed among the first sub-level module, the second sub-level module, and a third sub-level module included in the first-level module, wherein the first-level plurality of configuration sub-modules is configurable to receive and transmit the first control information, and wherein the first-level plurality of sub-modules includes a first-level plurality of registers, wherein the first-level plurality of configuration registers is configurable to be addressed with a single address.

3. The method of claim 1, wherein the second-level module includes a second-level plurality of configuration sub-modules, wherein the second-level plurality of configuration sub-modules is configurable to receive and transmit the first control information, and wherein the second-level plurality of configuration sub-modules includes a second-level plurality of registers, wherein the second-level plurality of registers is configurable to be addressed with a single address.

4. The method of claim 1, further comprising:
   receiving second control information with the interconnection network from one of the first-level module and the second-level module;
   receiving the second control information with the second sub-level module;
   receiving the second control information with the first sub-level module; and
   sending the second control information with the first sub-level module outside the integrated circuit device.

5. A machine-readable medium that provides instructions, which when executed by a machine, cause said machine to perform operations comprising:
   accepting first control information with a first sub-level module included in a first-level module of the integrated circuit device;
   sending the first control information with the first sub-level module to a second sub-level module included in the first-level module; and
   sending the first control information with the second sub-level module to an interconnection network included in the integrated circuit device; and
   sending the first control information with the interconnection network to the first-level module or a second-level module included in the integrated circuit device.

6. The machine-readable medium of claim 5, the operations further comprising:
   receiving second control information with the interconnection network from one of the first-level module and the second-level module;
   receiving the second control information with the second sub-level module;
   receiving the second control information with the first sub-level module; and
   sending the second control information with the first sub-level module outside the integrated circuit device.

7. An integrated circuit device comprising:
   a first-level module configurable to receive and transmit control information, said first level module including a first sub-level module, a second sub-level module operably coupleable to the first sub-level module, and a third sub-level module operably coupleable to the second sub-level module; and
   a second-level module operably coupleable to the first-level module, wherein an interconnection network is coupled between at least two of the sub-level module and facilitates transmission of the control information.

8. The integrated circuit device of claim 7, wherein the first-level module includes a first-level plurality of configuration sub-modules distributed among the first sub-level module, the second sub-level module, and the third sub-level module, wherein the first-level plurality of configuration sub-modules includes a first-level plurality of registers, wherein the first-level plurality of registers is configurable to receive and transmit the control information, and wherein the first-level plurality of registers is configurable to be addressed with a single address.

9. The integrated circuit device of claim 7, wherein the first sub-level module is configurable to be operably coupled to a Peripheral Component Interconnect Express® (PCIe®) bus, configurable to receive the control information from the PCIe® bus, and configurable to transmit the control information to the PCIe® bus.

10. The integrated circuit device of claim 7, wherein the second sub-level module is configurable to receive control information from and transmit control information to the first sub-level module, and configurable to receive control information and transmit control information to the first-level plurality of registers.

11. The integrated circuit device of claim 7, wherein the third sub-level module is configurable to receive control information from and transmit control information to the second sub-level module, and configurable to receive control information from and transmit control information to the second-level plurality of registers.

12. The integrated circuit device of claim 7, wherein the second-level module is operably coupleable to a Peripheral Component Interconnect (PCI) bus.

13. The integrated circuit device of claim 7, wherein the second-level module is operably coupleable to a PCIe® bus.

14. The integrated circuit device of claim 7, wherein the second-level module includes a second-level plurality of configuration sub-modules, wherein the second-level plurality of configuration sub-modules includes a second-level plurality of registers, wherein the second-level plurality of registers is configurable to receive and transmit control information, and wherein the second-level plurality of registers is configurable to be addressed with a single address.

15. The integrated circuit device of claim 14, wherein the second sub-level module is configurable to receive control information from and transmit control information to the first sub-level module, and configurable to receive and transmit control information to the second-level plurality of registers.

16. A computer system comprising:
a processor; and
a memory operably coupleable to the processor; and
an integrated circuit device operably coupleable to the processor, wherein the integrated circuit device includes
a first-level module configurable to receive and transmit control information, said first level module including
a first sub-level module, a second sub-level module operably coupleable to the first sub-level module, and
a third sub-level module operably coupleable to the second sub-level module, and
a second-level module operably coupleable to the first-level module, wherein an interconnection network is coupled between at least two of the sub-level module and facilitates transmission of the control information.

17. The computer system of claim 16, wherein the first-level module is configurable to be operably coupled to a Peripheral Component Interconnect Express® (PCIe®) bus, configurable to receive control information from the PCIe® bus, and configurable to transmit control information to the PCIe® bus.

18. The computer system of claim 16, wherein the second-level module is operably coupleable to a Peripheral Component Interconnect (PCI) bus.

19. The computer system of claim 16, wherein the second-level module is operably coupleable to a PCIe® bus.

* * * * *